United States Patent
Lee et al.

(10) Patent No.: US 7,907,597 B2
(45) Date of Patent: Mar. 15, 2011

(54) METHOD AND APPARATUS FOR PROVIDING VOICE AND DATA SERVICES IN A MOBILE COMMUNICATION SYSTEM WITH VARIOUS OVERLAPPED ACCESS NETWORKS

(75) Inventors: Sang-Do Lee, Suwon-si (KR); Jin-Man Kim, Yongin-si (KR); Tae-Won Kim, Yongin-si (KR); Hong-Sung Chang, Suwon-si (KR); Jae-Jeong Shim, Seoul (KR); Geun-Hwi Lim, Seongnam-si (KR); Je-Hyun Jung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1658 days.

(21) Appl. No.: 10/926,146

(22) Filed: Aug. 26, 2004

(65) Prior Publication Data

US 2005/0047399 A1    Mar. 3, 2005

(30) Foreign Application Priority Data

Aug. 29, 2003  (KR) .................. 10-2003-0060190

(51) Int. Cl.
*H04L 12/66* (2006.01)
(52) U.S. Cl. ......... 370/352; 370/338; 370/385; 370/401; 379/88.17; 358/1.15; 455/417; 455/466; 455/555
(58) Field of Classification Search ............... 455/414.3, 455/437, 442, 443, 445, 432.1, 422.1, 433, 455/436, 456, 417, 466, 555; 370/338, 349, 370/352, 385, 401; 709/206, 228; 358/1.15; 379/88.17
See application file for complete search history.

(56) References Cited

U.S. PATENT DOCUMENTS

| | | | | |
|---|---|---|---|---|
| 5,771,275 A | * | 6/1998 | Brunner et al. | 370/385 |
| 5,943,399 A | * | 8/1999 | Bannister et al. | 379/88.17 |
| 6,295,457 B1 | * | 9/2001 | Narayanaswamy | 455/466 |
| 6,314,284 B1 | * | 11/2001 | Patel et al. | 455/417 |
| 6,349,224 B1 | * | 2/2002 | Lim | 455/466 |
| 6,389,008 B1 | | 5/2002 | Lupien et al. | 370/352 |
| 6,404,754 B1 | * | 6/2002 | Lim | 370/338 |
| 6,483,600 B1 | * | 11/2002 | Schuster et al. | 358/1.15 |
| 6,490,451 B1 | * | 12/2002 | Denman et al. | 455/436 |
| 6,539,237 B1 | * | 3/2003 | Sayers et al. | 455/555 |
| 6,560,216 B1 | * | 5/2003 | McNiff et al. | 370/349 |

(Continued)

FOREIGN PATENT DOCUMENTS

JP    11-313368    9/1999

(Continued)

*Primary Examiner* — Gerald Gauthier
(74) *Attorney, Agent, or Firm* — Roylance, Abrams, Berdo & Goodman, LLP

(57) ABSTRACT

An apparatus and method for seamlessly providing voice and data services to a user through an access terminal in a mobile communication system including a heterogeneous service & mobility gateway (HSMG) for an interworking service between a circuit network and a packet network, and various access networks overlapping each other. The access terminal notifies the HSMG that a voice call is received, if the access terminal that accessed a packet network receives a voice call. The HSMG sends a direction request to a circuit network upon receiving the notification indicating that the voice call is received. The access terminal directs to the circuit network and registers a new location upon receiving the direction request. The HSMG sets up an incoming voice call to the access terminal after the registration of a new location.

4 Claims, 7 Drawing Sheets

U.S. PATENT DOCUMENTS

| | | | |
|---|---|---|---|
| 6,608,832 B2 * | 8/2003 | Forslow | 370/353 |
| 6,729,929 B1 * | 5/2004 | Sayers et al. | 455/446 |
| 6,792,278 B1 * | 9/2004 | Ahmavaara et al. | 455/461 |
| 6,795,444 B1 * | 9/2004 | Vo et al. | 370/401 |
| 6,970,719 B1 * | 11/2005 | McConnell et al. | 455/554.1 |
| 7,010,300 B1 * | 3/2006 | Jones et al. | 455/439 |
| 7,164,913 B1 * | 1/2007 | Dantu et al. | 455/436 |
| 7,383,042 B2 * | 6/2008 | Lamb et al. | 455/433 |
| 2002/0023162 A1 | 2/2002 | Ahn et al. | 709/230 |
| 2002/0072376 A1 * | 6/2002 | Carlsson et al. | 455/456 |
| 2002/0085537 A1 | 7/2002 | Carlsson et al. | 370/352 |
| 2002/0122401 A1 * | 9/2002 | Xiang et al. | 370/338 |
| 2002/0126656 A1 * | 9/2002 | Park | 370/352 |
| 2003/0027595 A1 | 2/2003 | Ejzak | 455/560 |
| 2003/0135624 A1 * | 7/2003 | McKinnon et al. | 709/228 |
| 2003/0210683 A1 * | 11/2003 | Bais et al. | 370/352 |
| 2004/0240430 A1 * | 12/2004 | Lin et al. | 370/352 |
| 2007/0037569 A1 * | 2/2007 | McNiff et al. | 455/422.1 |
| 2007/0118604 A1 * | 5/2007 | Costa Requena | 709/206 |

FOREIGN PATENT DOCUMENTS

| | | |
|---|---|---|
| JP | 2002-186011 | 6/2002 |
| JP | 2003-115849 | 4/2003 |
| JP | 2003-169359 | 6/2003 |
| KR | 2001-0046483 | 6/2001 |
| KR | 2002-0078326 | 9/2002 |
| WO | WO-02/03720 A2 | 1/2002 |
| WO | WO 02 080011 A1 | 10/2002 |
| WO | WO-02/093945 A2 | 11/2002 |

* cited by examiner

METHOD AND APPARATUS FOR PROVIDING VOICE AND DATA SERVICES IN A MOBILE COMMUNICATION SYSTEM WITH VARIOUS OVERLAPPED ACCESS NETWORKS

PRIORITY

This application claims the benefit under 35 U.S.C. §119 (a) to an application entitled "Method and Apparatus for Providing Voice and Data services in a Mobile Communication System with Various Overlapped Access Networks" filed in the Korean Intellectual Property Office on Aug. 29, 2003 and assigned Serial No. 2003-60190, the entire contents of which are incorporated herein by reference.

BACKGROUND OF THE INVENTION

1. Field of the Invention

The present invention relates generally to a method and apparatus for providing voice and data services in a mobile communication system. In particular, the present invention relates to a method and apparatus for providing an integrated voice/data service in a network environment in which various access networks overlap each other.

2. Description of the Related Art

Mobile communication systems have developed from $1^{st}$ Generation (1G) and $2^{nd}$ Generation (2G) systems which chiefly provide a voice service using a circuit network into an International Mobile Telecommunication-2000 (IMT-2000) system which is a $3^{rd}$ Generation (3G) digital mobile communication system. The IMT-2000 system, unlike the 1G and 2G mobile communication systems, provides a packet data service for allowing subscribers to access the mobile Internet in a wide-spread mobile communication environment. In case of a Code Division Multiple Access 1X (CDMA2000 1X) system, which is related to the IMT-2000 system, a user accessing an Internet Protocol (IP) network via a wireless access network can receive a data service at a rate of a maximum of 153.6 Kbps, and in case of First Evolution-Data Only (1x EV-DO) system, the user can receive a data service at a rate of a maximum of 2.4 Mbps. However, the mobile communication network has limitations in providing a high-speed packet data service.

Recently, with the evolution of the mobile communication environment, various wireless access technologies such as Wireless LAN or High Performance Local Area Network version 2 (HiperLAN/2) based on IEEE 802.11x and Bluetooth have been proposed. Such technologies, although they cannot guarantee mobility up to the level of the cellular mobile communication system, were proposed as an alternate for providing a high-speed data service in a hot spot zone including public places or in a home network environment, replacing the fixed networks such as cable modems or Digital Subscriber Line (xDSL)-based networks. For example, an IEEE 802.1b-based wireless LAN provides a data rate of about 11 Mbps at a 2.4-GHz ISM band, and an IEEE 802.11a-based wireless LAN provides a data rate of a maximum of 54 Mbps at a 5-GHz ISM band, enabling a high-speed wireless data service with the low cost.

Such wireless access technologies, although they provide a high data rate, have limitations in providing public network-based services due to extremely limited mobility, a narrow coverage and interference, caused when a high-speed data service is provided with the wireless LAN. In order to cope with these limitations, studies are being conducted on wireless Metropolitan Area Network (MAN) technology developed by benefiting from advantages and compensating for disadvantages of the cellular mobile communication system and the Wireless LAN system. A 2.3-GHz band High-speed Portable Internet (HPi) system, a typical example of the Wireless MAN technology, can provide a throughput of 50 Mbps per cell using various types of access terminals in a stationary indoor/outdoor environment and a mobile environment for a pedestrian speed and a mid/low speed (about 60 Km/h). In addition, the HPi system supports a wide-range data rate according to conditions of a radio channel.

However, as the wireless access technologies for providing various data rates and mobilities in a wireless environment are standardized, it is necessary to provide a service capable of meeting various user's demands by benefiting from advantages and compensating for disadvantages of different technologies. Further, in order to provide such a service, it is necessary to seamlessly provide voice and data services to a user who accesses a serving network via an optimal access network.

Recently, with the rapid development of communication technology and the sharp increase in users' demands, efforts are being made to integrate a circuit network-based voice service with a packet network-based data service into a multimedia service through the Internet. As an example of the multimedia service, there is a Voice over Internet Protocol (VoIP) technology for transmitting voice via the Internet. Recently, ITU-T and IETF committees have led standardization on the VoIP technology and introduced various technologies. Along with such a tendency, next-generation mobile communication standardization organizations including $3^{rd}$ Generation Partnership Project (3GPP) and 3GPP2 committees are conducting standardization on technologies capable of defining a configuration of an IP-based integrated network and providing a multimedia service to mobile subscribers. As yet, however, the technologies cannot guarantee quality-of-service (QoS) for a voice service provided in the IP network, and cannot achieve QoS higher than that of a voice service provided in the existing public switched telephone network (PSTN). In particular, when a VoIP service is provided in a wireless environment, considerable effort and cost are needed to secure stable QoS while providing a user with wide-range mobility. Therefore, although the VoIP technology is highly developed, the VoIP service is expected to gradually evolve from the existing PSTN-based voice service. Even after the completion of standardization on an All-IP network, because the PSTN-based voice service will be continuously used, there is a demand for interworking between a circuit network and a packet network.

SUMMARY OF THE INVENTION

It is, therefore, an object of the present invention to provide an apparatus and method for seamlessly providing voice and data services to an access terminal which performs communication via various access networks.

It is another object of the present invention to provide an apparatus and method for seamlessly providing voice and data services to an access terminal which accesses various access networks to perform location management and service transfer on an access terminal.

It is further another object of the present invention to provide an apparatus and method for seamlessly providing voice and data services to an access terminal which accesses various access networks, by interworking a circuit network with a packet network.

In accordance with one aspect of the present invention, there is provided a method for seamlessly providing voice and data services by an access terminal in a mobile communication system including a heterogeneous service & mobility gateway (HSMG) for an interworking service between a circuit network and a packet network, and various access networks overlapping each other. The method comprising the steps of selecting an optimal access network for receiving the voice and data services and directing traffic to the selected access network, when the access terminal that accessed a particular network receives a service request and/or moves out of the accessed network; sending a registration request to the directed access network; and receiving packet data after registration to the directed access network.

In accordance with another aspect of the present invention, there is provided a method for seamlessly providing voice and data services through an access terminal in a mobile communication system including a heterogeneous service & mobility gateway (HSMG) for an interworking service between a circuit network and a packet network, and various access networks overlapping each other. The method comprising the steps of notifying, by the access terminal, the HSMG that a voice call is received, if the access terminal that accessed a packet network receives a voice call; sending a direction request to a circuit network by the HSMG upon receiving the notification indicating that the voice call is received; directing traffic to the circuit network and registering a new location by the access terminal upon receiving the direction request; and setting up an incoming voice call to the access terminal by the HSMG after the registration of a new location.

In accordance with further another aspect of the present invention, there is provided a method for seamlessly providing voice and data services through an access terminal in a mobile communication system including a heterogeneous service & mobility gateway (HSMG) for an interworking service between a circuit network and a packet network, and various access networks overlapping each other. The method comprising the steps of monitoring, by the access terminal, only a paging channel of the circuit network, and notifying the HSMG that a packet call is received, when the packet call is received; sending a direction request to a packet network by the HSMG upon receiving the notification indicting that the packet call is received; transitioning to a packet network and registering a new location by the access terminal upon receiving the direction request; and setting up an incoming packet call to the access terminal by the HSMG after the registration of a new location.

In accordance with yet further another aspect of the present invention, there is provided a method for seamlessly providing voice and data services through an access terminal in a mobile communication system including a heterogeneous service & mobility gateway (HSMG) for an interworking service between a circuit network and a packet network, and various access networks overlapping each other. The method comprising the steps of receiving, by the HSMG, an Internet protocol packet data service request and sending a redirection request to the packet network, when the access terminal holding a dormant session of the packet network monitors only a paging channel of the circuit network; redirecting traffic to the packet network by the access terminal upon receiving the redirection request to the packet network; and transitioning, by the access terminal, to an active state and sending a registration message to the HSMG.

In accordance with still further another aspect of the present invention, there is provided an apparatus for seamlessly providing voice and data services through an access terminal by interworking a circuit network with a packet network in a mobile communication system with a plurality of access networks overlapping each other. The apparatus comprising a heterogeneous service & mobility gateway (HSMG) for managing an access state of the access terminal through location registration requested by the access terminal, and changing a protocol for an interworking service between the circuit network and the packet network; and a home location register connected to the HSMG, for storing a service profile related to reception of voice and data calls of the access terminal that accessed the circuit network, and determining whether the access terminal can interwork a plurality of the access networks.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

Figure 1:
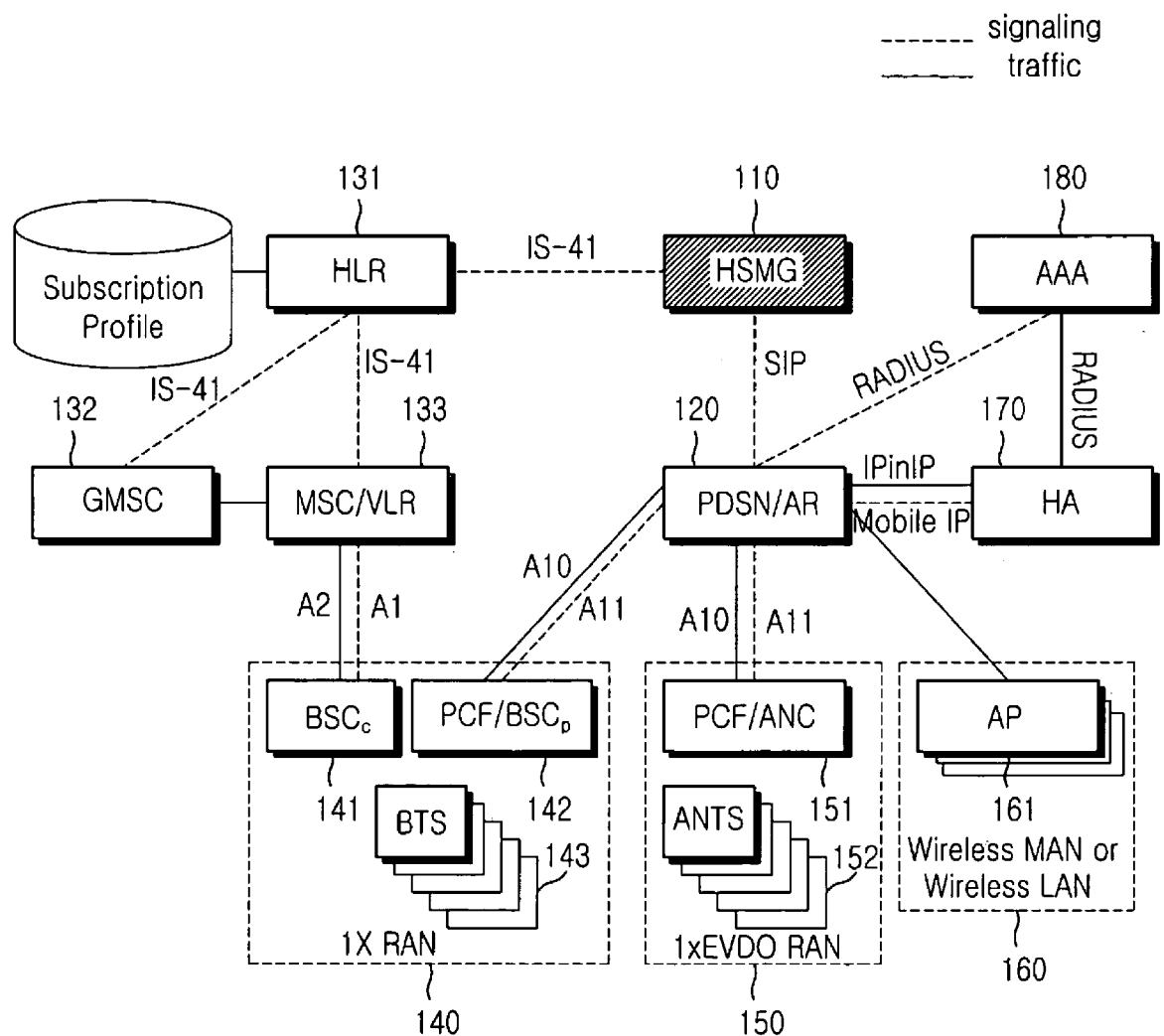
FIG. 1 is a diagram illustrating a configuration of a heterogeneous network according to an embodiment of the present invention.

A preferred embodiment of the present invention will now be described in detail with reference to the accompanying drawings. In the drawings, the same or similar elements are denoted by the same reference numerals even though they are depicted in different drawings. In the following description, a detailed description of known functions and configurations incorporated herein has been omitted for conciseness.

The embodiment of the present invention will be described with reference to a heterogeneous network communication environment where an access terminal can access a particular access network in a region where cellular mobile communication systems, such as Code Division Multiple Access 2000 1X (CDMA2000 1X) system, First Evolution-Data Only (1x EV-DO) system and Universal Mobile Telecommunications System/General Packet Radio Service (UMTS/GPRS) system, overlap with various wireless access networks, such as Wireless Local Area Network/Metropolitan Area Network (LAN/MAN) system and High Performance Local Area Network version 2 (HiperLAN/2) system. A network configuration according to an embodiment of the present invention interworks a circuit network with a packet network by adding a heterogeneous (or packet) service & mobility gateway (HSMG) to network elements, such as a mobile switching center (MSC), visitor location register (VLR), home location register (HLR), packet data service node (PDSN) and access point (AP), defined in the conventional mobile communication system and Wireless LAN/MAN system.

FIG. 1 is a diagram illustrating a configuration of a heterogeneous network according to an embodiment of the present invention. It should be noted herein that although a packet data service node (PDSN) interworks with base stations in a CDMA2000 1X (1X RAN) network and a 1x EV-DO network and an access router (AR) interworks with a base station in a Wireless LAN/MAN network, they perform the same function, so that the PDSN and the access router are represented herein by 'PDSN/AR'. Although the PDSN and the access router are represented herein by the same reference label for the convenience of explanation, the PDSN and the access router will be separately described according to the networks with which they interwork.

The heterogeneous network comprises various existing access networks, such as a CDMA2000 1X (1X Radio Access Network (RAN)) network 140, a 1x EV-DO network 150 and a Wireless LAN/MAN network 160, and a heterogeneous (or packet) service & mobility gateway (HSMG) 110 for providing an interworking service between a circuit network and a packet network to a user who accesses a serving network via the above various access networks.

The HSMG 110 is connected between an IP network of a user and a Signaling System Number 7 (SS7) network. That is, the HSMG 110 is connected to a home location register (HLR) 131 using an IS-41 protocol, and to a packet data service node/access router (PDSN/AR) 120 and a session initiation protocol (SIP) server (not shown) using an SIP protocol. Referring to FIG. 1, the SS7 network corresponds to an IS-41 protocol-based network, and comprises the HLR 131 and a gateway MSC (GMSC) 132, and the IP network corresponds to an IP-based network and comprises the PDSN/AR 120, an Authentication, Authorization and Accounting (AAA) server 180 and a home agent (HA) 170. The HSMG 110 performs protocol conversion between the IS-41 protocol and the SIP protocol, and manages access states of a user and an access terminal through a location registration process from an access terminal (not shown) and a SIP registration process from the PDSN/AR 120. The access terminal's access states managed by the HSMG 110 are divided into an 'on-packet' state and an 'on-circuit' state. The HSMG 110 performs a SIP register function to perform location management on subscribers who access an IP network via various access networks, and manages a mutual connection relation between MS Identification Number (MIN), IP address and Network Access Identifier (NAI) information, based on subscriber's information received through a location registration process of an access terminal. Here, although the access terminal can communicate with both a circuit network and a packet network, the access network monitors any one of the CDMA2000 1X network 140, the 1x EV-DO network 150 and the Wireless LAN/MAN network 160.

The HLR 131 connected to the HSMG 110 stores therein a service profile for a user who accesses a serving network, and performs location management, state management and authentication on an access terminal and a subscriber based on the service profile, thereby providing an automatic roaming service to users having mobility. In addition to such generation functions, the HLR 131 stores a service profile related to a hybrid operation of an access terminal, and to reception of voice and data calls of a user who accessed a circuit network, for an interworking service between the circuit network and a packet network. When processing an incoming call sent by an access terminal or a PSTN, the HLR 131 recognizes that a type of the access terminal is a hybrid access terminal (HAT) applied to a heterogeneous network. The type of the access terminal is included in user information stored in the HLR 131.

The PDSN/AR 120 connected to the HSMG 110 with the SIP protocol sets up a Layer-2 connection to the HAT through a point-to-point protocol (PPP) connection. The PDSN/AR 120 performs functions related to IP address allocation, IP packet routing, frequency allocation for a Mobile IP service, interworking with an Authentication, Authorization and Accounting (AAA) server 180 for accounting and authentication, and QoS support. In addition to such general functions, the PDSN/AR 120 performs the following functions in order to support an interworking service between the circuit network and the packet network.

If a HAT of a user who subscribed for a Simple IP service performs a SIP registration process, the PDSN/AR 120 sends a SIP Registration message to the HSMG 110, and if a HAT of a user who subscribed for a Mobile IP service performs a Mobile IP registration process, the PDSN/AR 120 sends a SIP Registration message to the HSMG 110. Each time the HAT moves between access networks while maintaining a PPP connection to the PDSN/AR 120, the PDSN/AR 120 sends a SIP Registration message to the HSMG 110.

If an IP packet transmitted to a HAT in an 'on-circuit' state is received, the PDSN/AR 120 performs buffering on the IP packet until the HAT accesses via a packet access network (AN), and manages access states of a user and a HAT through a SIP or Mobile IP registration process from the HAT and a notification process from the HLR 131. If a HAT's access state managed by the PDSN/AR 120 indicates that the HAT communicates with a packet network, the access state is referred to as a "on-packet" state, and if the HAT's access state indicates that the HAT communicates with a circuit network, the access state is referred to as a 'on-circuit' state.

The AAA server 180 accesses the PDSN/AR 120 using a Radius or Diameter protocol, and transmits/receives authentication and accounting information and subscriber information for a HAT and a user to the PDSN/AR 120. Further, the AAA server 180 stores a user profile related to a hybrid operation of the HAT. Because network elements of the CDMA2000 1X network 140, the 1x EV-DO network 150 and the Wireless LAN/MAN network 160 are well known in the art, a detailed description thereof will be omitted herein for simplicity. Also, because a mobile switching center/visitor location register (MSC/VLR) 133 and a gateway MSC (GMSC) 132 connected to the CDMA2000 1X network 140, and a home agent (HA) 170 connected to the Wireless LAN/MAN network 160 are well known in the art, a description thereof will be omitted herein for simplicity.

Interfaces and protocols used in the above-described heterogeneous network will now be described herein below with reference to FIG. 1.

An interface A1 transmits a message including signaling information between the MSC/VLR 133 and a circuit base station controller ($BSC_C$) 141 in the CDMA2000 1X network 140. An interface A2 transmits 64/56-Kbps pulse code modulation (PCM) or 64-Kbps voice information between the MSC/VLR 133 and SDU function elements of the $BSC_C$ 141 and a packet control function/packet base station controller ($PCF/BSC_P$) 142.

An interface A10 transmits user traffic between the packet data service node 120 and a packet control function (PCF) 151 in the 1x EV-DO network 150. An interface A11 transmits signaling information between the packet control function 151 and the packet data service node 120.

IS-41 between the HSMG 110 and the HLR 131 represents a signaling protocol for supporting interworking between cellular systems in the CDMA2000 1X network 140, and activates interfaces applied between the MSC/VLR 133 and the HLR 131 or between MSCs according to a predefined procedure. A major function of the IS-41 protocol includes a location and state management function for a user and a HAT, an automatic roaming support function, an intersystem handoff support function, and an Operation and Management (O&M) function.

SIP represents a signaling protocol for providing a call setup and control function in an IP network, and a major function of the SIP protocol includes an end-to-end multimedia session setup function, and a user presence and personal mobility function.

Mobile IP between the PDSN/AR 120 and the HA 170 represents a protocol capable of securing continuity of a session for an upper layer even though a HAT crosses a boundary of an IP network while maintaining an IP address, and provides a 2-step addressing system.

RADIUS connecting the AAA server 180 to the PDSN/AR 120 and the HA 170 represents a protocol applied between a network access server (NAS) and an AAA server or between AAA servers, and provides an authentication/authorization/accounting function for a user and a HAT.

A description will now be made of a method for seamlessly providing voice and data services to a user who accesses a serving network via various access networks in the heterogeneous network. For this, a hybrid operation of a HAT and an operation related to mobility management and service transfer for an access network are needed. The operations can be applied not only to cellular mobile communication systems except the CDMA2000 1X system and the 1x EV-DV system, but also to a next generation high-speed mobile communication system such as a Wireless MAN system including an HPi system. First, the hybrid operation will be described with reference to the accompanying drawing.

Figure 2:
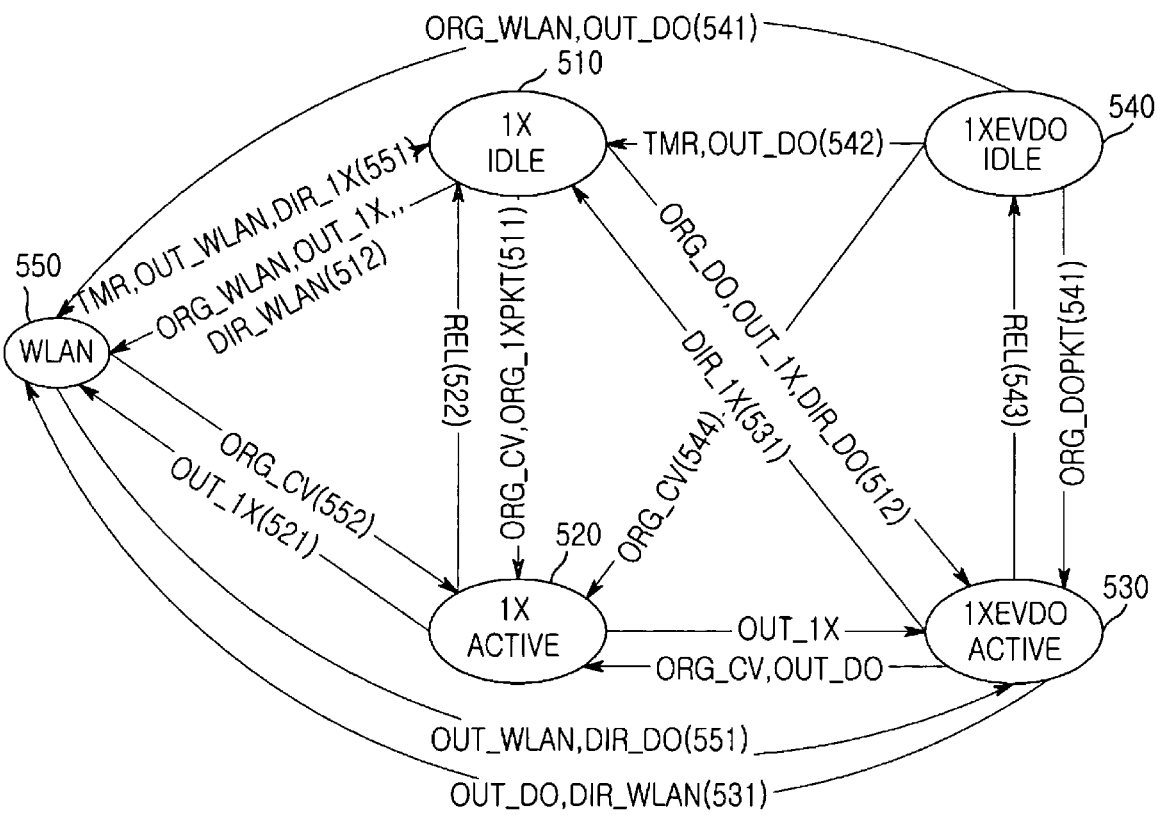
FIG. 2 is a diagram illustrating a state transition operation in a hybrid operation according to an embodiment of the present invention.

FIG. 2 is a diagram illustrating state transitions in a hybrid operation according to an embodiment of the present invention. A description of events occurring during state transitions in a hybrid operation illustrated in FIG. 2 is given in Table 1.

TABLE 1

| Event | Description |
| --- | --- |
| ORG_1XPKT | A 1X packet data call is originated at the request of a user or service. |
| ORG_DO | A 1xEV-DO high-speed packet data call is originated at the request of a user or service. |
| ORG_WLAN | Packet is transmitted via Wireless LAN at the request of a user or service. |
| ORG_CV | Access to 1X access network is made and a circuit voice call is originated at the request of a user or service. |
| OUT_1X | HAT moves out of a 1X access network area and searches a new network due to its movement or a change in a wireless environment. HAT can access a 1xEV-DO or Wireless LAN access network. |
| OUT_DO | HAT moves out of a 1xEV-DO access network area and searches a new network due to its movement or a change in a wireless environment. HAT can access a 1X or |

TABLE 1-continued

| Event | Description |
| --- | --- |
| | Wireless LAN access network. |
| OUT_WLAN | HAT moves out of a Wireless LAN area and searches a new network due to its movement or a change in a wireless environment. HAT can access a 1X or 1xEV-DO access network. |
| DIR_1X | HAT redirects to a 1X access network when a network requests redirection. This even occurs when transmitting a circuit network service including a voice call or a 1X packet data service including VoIP to HAT that accessed a 1xEV-DO or Wireless LAN access network. |
| DIR_DO | HAT redirects to a 1xEV-DO access network when a network requests redirection. |
| DIR_WLAN | HAT redirects to a Wireless LAN access network when a network requests redirection. |
| REL | After end of a voice call or a packet call, HAT releases radio resources including a traffic channel assigned from an access network. |
| TMR | Timer expired. |

A 1X Idle state 510 represents a state in which an HAT is assigned no radio resource from a CDMA 1X access network. In this state, because the HAT monitors only a CDMA 1X paging channel, the HAT receives a paging message for a CDMA 1X voice or packet data call over a CDMA 1X paging channel. In step 511, the HAT originates a circuit voice call after accessing a CDMA 1X access network, and originates a CDMA 1X packet data call at the user's service request.

In this state, if the HAT moves out of coverage of the CDMA 1X access network (OUT_1X) or receives a redirection request to a packet network over a CDMA 1X paging channel, the HAT transitions, in step 512, to a 1x EV-DO Active state 530 or a WLAN state 550 (DIR_DO, DIR_WLAN) after selecting an optimal network from a 1x EV-DO access network and a WLAN network, and sets up a high-speed packet data call (ORG_DO, ORG_WLAN).

In the case where the HAT transitions to the 1x EV-DO Active state 530 in step 512, the HAT is assigned radio resources from the 1x EV-DO access network. In this state, if the HAT transmits and receives high-speed data traffic and a signaling message over a 1x EV-DO channel, the HAT monitors only the 1x EV-DO channel. In this state, if the HAT moves out of coverage of the 1x EV-DO access network (OUT_DO) or receives a redirection request, the HAT transitions, in step 531, to the 1X Idle state 510 or the WLAN state 550 (OUT_DO, DIR_WLAN) after selecting an optimal network from the CDMA 1X network and the Wireless LAN/MAN network.

In the case where the HAT transitions to the WLAN state 550 in step 512, the HAT accesses the Wireless LAN/MAN network. In this state, the HAT transitions to the 1X Idle state 510 after a lapse of a predetermined time. In this case, the HAT does not detect other networks except the Wireless LAN network. In this state, if the HAT moves out of coverage of the Wireless LAN network (OUT_WLAN) or receives a redirection request, the HAT transitions, in step 551, to the 1x Idle state 510 or the 1x EV-DO Active state 530 (DIR_1X, DIR_DO) after selecting an optimal network from the CDMA 1X network and the 1x EV-DO network.

If the HAT is in a 1X Active state 520, the HAT is assigned radio resources from the CDMA 1X system. In this state, the HAT transmits and receives not only voice and data traffic but also a signaling message over a 1X traffic channel. In this state, if the HAT moves out of coverage of the 1X access network (OUT_1X), the HAT transitions to the 1x EV-DO Active state 530 or the WLAN state 550 in step 521. In step 522, as a voice call or a packet call ends, the HAT releases radio resources including a traffic channel assigned from the CDMA 1X network (REL).

If the HAT is in a 1x EV-DO Idle state 540, the HAT is not assigned radio resources from the 1x EV-DO access network. In this state, because the HAT monitors only a 1x EV-DO paging channel, the HAT receives a paging message for high-speed packet data over the 1x EV-DO paging channel. In this state, if there is a service request from the user, the HAT originates a 1x EV-DO packet data call in step 541 (ORG_DO).

In this state, if the HAT moves out of coverage of the 1x EV-DO access network in step 551, the HAT transitions, in step 542, to the 1X Idle state 510 after a lapse of a predetermined time (TMR). That is, the HAT transitions to the 1X Idle state 510 or the WLAN state 550 after selecting an optimal network from the 1X access network and the Wireless LAN network. In step 543, as a voice call or a packet call ends, the HAT releases radio resources including a traffic channel assigned from the 1x EV-DO network (REL). If the HAT is in the 1x EV-DO Idle state 540, the HAT transitions, in step 544, to the 1X Active state 520 and originates a CDMA2000 1X voice call.

In this state transition operation, when a redirection process for transmitting a circuit network-based service is performed, the HAT transitions to the 1X Idle state 510 and operates in a non-slotted mode, thereby reducing a time required when the HAT receives a service after accessing again the CDMA 1X network, i.e., reducing a processing time for a 1X paging message. If the HAT fails to receive a paging message from the 1X access network for a predetermined time, the HAT operates in a slotted mode.

Next, an operation for managing mobility will be described herein below.

In a cellular mobile communication system currently in service, a HLR and a VLR manages a service profile and location information for a user who subscribed to a circuit network-based service. In the case where the user subscribed to a packet service, an AAA server manages a service profile for the user, and the packet service is divided into a Simple IP service and a Mobile IP service according to whether IP mobility is supportable.

If the user subscribed to the Simple IP service, because only mobility of a Link layer is provided on a network-by-network basis, the HAT must be assigned a new IP address each time it moves between PDSNs. However, if the user subscribed to the Mobile IP service, because a HA and a PDSN provide mobility in an IP layer, the HAT can maintain its old IP address even though it moves between PDSNs.

Although the network configuration disclosed in the embodiment of the present invention has the same mobility management function for the user and the HAT as that provided by the existing network elements, the proposed network configuration performs additional functions required for providing a circuit network/packet network interworking service by the HLR and the PDSN/AR in cooperation with the HSMG. The additional mobility management functions are illustrated in Table 2.

TABLE 2

| Function | Description |
| --- | --- |
| Access State Management | HSMG and PDSN manage an access state of HAT as 'on-circuit' state when the HAT accesses a circuit network, and manage the access state as 'on-packet' state when the HAT accesses a packet network. |

TABLE 2-continued

| Function | Description |
| --- | --- |
| Location Information Management | When HAT accesses a circuit network, HLR stores location information of a user and the HAT. When HAT accesses a packet network, HSMG stores location information of a user and the HAT. |
| Circuit Network Registration | When HAT that accessed a circuit network performs a location registration process via MSC/VLR, HLR provides corresponding information to HSMG. |
| Packet Network Registration | When HAT accesses a packet network, PDSN/AR sends a SIP Registration message to HSMG thereby to inform that HAT is located in the packet network. |

In Table 2, the additional mobility management functions correspond to access state management, location information management, circuit network registration, and packet network registration functions. In the access state management function, an HSMG and a PDSN manage an access state of an HAT as an 'on-circuit' state when the HAT accesses a circuit network, and manage the access state as an 'on-packet' state when the HAT accesses a packet network. In the location information management function, when an HAT accesses a circuit network, a HLR stores location information of a user and the HAT, and when an HAT accesses a packet network, an HSMG stores location information of a user and the HAT. In the circuit network registration process, when an HAT that accessed a circuit network performs a location registration process via an MSC/VLR, the HLR provides corresponding information to the HSMG. In packet network registration function, when an HAT accesses a packet network, the PDSN/AR sends a SIP Registration message to the HSMG thereby to inform that the HAT is located in the packet network.

The circuit network registration operation among the mobility management functions will now be described herein below with reference to the accompanying drawing.

Figure 3:
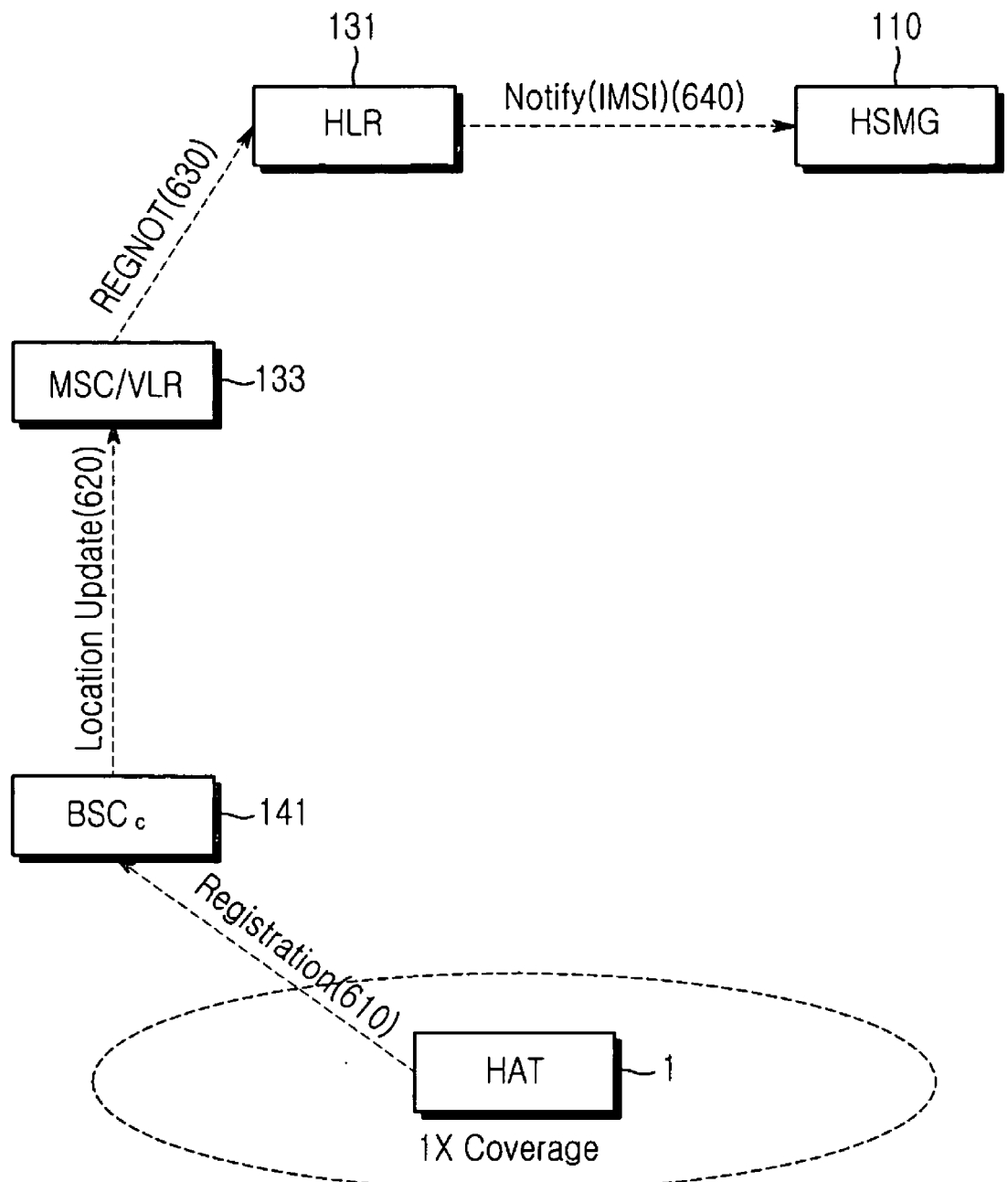
FIG. 3 is a diagram illustrating a circuit network registration operation of a Hybrid Access Terminal (HAT) located in a Code Division Multiple Access 2000 1X (CDMA2000 1X) region in a heterogeneous network according to an embodiment of the present invention.

FIG. 3 is a diagram illustrating a circuit network registration operation of an HAT located in a CDMA2000 1X region in a heterogeneous network according to an embodiment of the present invention. Referring to FIG. 3, in step 610, a HAT 1 transmits a Registration message to a circuit base station controller ($BSC_C$) 141 in order to receive an access approval. In step 620, the HAT 1 transmits its location information to an MSC/VLR 133 and a HLR 131 via the $BSC_C$ 141. The HAT 1 defines a location registration type as 'power-on' location registration. A call processing process applied to the HAT 1 through the HLR 131 is identical to a general call processing process.

If the HLR 131 receives, in step 630, from the MSC/VLR 133 the location registration information of the HAT 1 that subscribed to an interworking service between a circuit network and a packet network, the HLR 131 transmits, in step 640, a Notify message to an HSMG 110 to notify that the HAT 1 accessed a circuit network. Then the HSMG 110 sets state information of the HAT 1 to an 'on-circuit' state. When a user mainly uses a packet service, the HAT 1, after end of a circuit service, can transition to a 1x EV-DO Idle state or a WLAN state and perform a packet network registration process. In contrast, when the user mainly uses a circuit service, the HAT 1, after the end of the circuit service, holds a 1X Idle state until there is an incoming/outgoing packet call or there is a direction request to the packet network.

Figure 4:
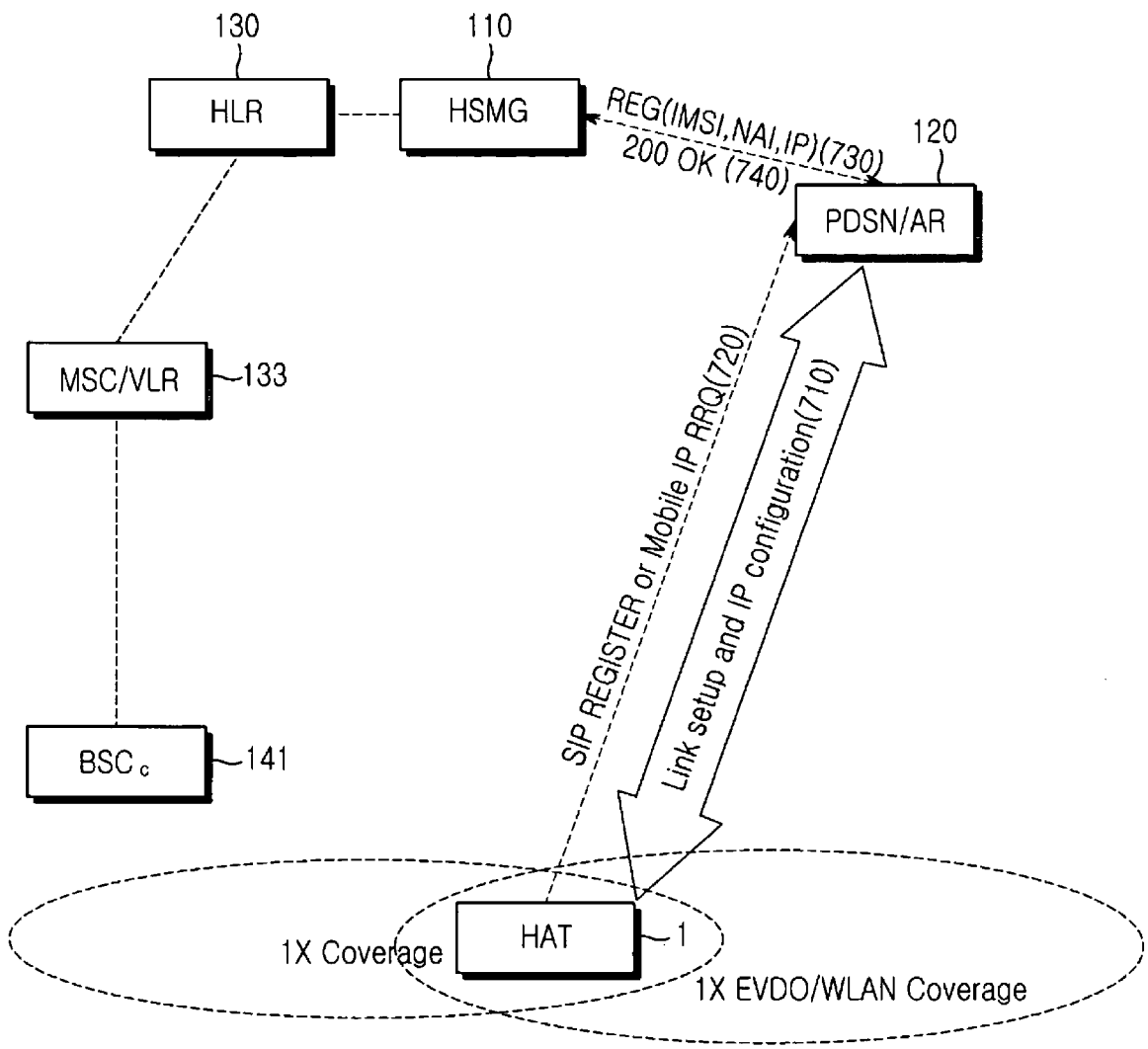
FIG. 4 is a diagram illustrating a packet network registration operation performed when a HAT is directed from a CDMA2000 1X network to a First Evolution-Data Only (1x EV-DO) or Wireless Local Area Network/Metropolitan Area Network (LAN/MAN) network according to an embodiment of the present invention.

FIG. 4 is a diagram illustrating a packet network registration operation performed when a HAT directed from a CDMA2000 1X network to a 1x EV-DO or Wireless LAN/MAN network according to an embodiment of the present invention. Referring to FIG. 4, when an HAT 1 located in coverage of a 1x EV-DO or Wireless LAN network originates a packet call or directs from a CDMA 1X network to the 1x EV-DO or Wireless LAN network, the HAT 1 performs a SIP or Mobile IP registration process with a PDSN/AR 120 in steps 710 and 720. In step 730, the PDSN/AR 120 sends a SIP Registration message to an HSMG 110. The HSMG 110 receiving the SIP Registration message sets an access state of the HAT 1 to an 'on-packet' state, and stores location information of a user and the HAT 1 in a location database. If the user gives priority to a circuit network-based service, the HAT 1, after end of a packet service, transitions from a 1x EV-DO Idle state or a WLAN state to a 1X Idle state after a lapse of a predetermined time, and performs a circuit network registration process. In contrast, if the user gives priority to a packet service, the HAT 1, after the end of the packet service, maintains the 1x EV-DO Idle state or the WLAN state until there is an incoming/outgoing packet call or there is a direction request to the circuit network.

A description will now be made of a service transfer operation for allowing a HAT to direct to an access network most appropriate for each service by applying the mobility management operation and then receiving a circuit voice call or a packet call.

When voice and data services are provided to a user who accesses a particular access network, a HAT is directed to an access network most appropriate to each service before the corresponding service is transferred. That is, when a circuit network-based service such as a mobile phone service and a short message service (SMS) is transferred, the HAT is directed to a 1X access network, and when a packet service such as an IP Push service and a moving image service is transferred, the HAT is directed to a 1x EV-DO network or a Wireless LAN/MAN network according to a service requirement such as a service profile and quality-of-service (QoS). However, a packet data service can be provided via the CDMA 1X network according to the service requirement. In particular, a VoIP service is provided via the CDMA 1X network.

In order to transfer a service to a user accessing various access networks in the best method, the functions illustrated in Table 3 are needed.

TABLE 3

| Function | Description |
| --- | --- |
| Access State Management | This is a function included in mobility management functions. When a service is transferred to an HAT, a call processing process is performed differently according to an access state of the HAT. |
| Access Network Selection | An access network should be able to be selected according to a type of a service to be transferred to a user, a service profile of a subscriber, a QoS requirement, and a radio environment. |
| Redirection | When a best access network selected by a serving network is different from an access network accessed by an HAT, the HAT is requested to direct to the selected access network. |

The functions illustrated in Table 3 include access state management, access network selection, and redirection functions. The access state management function is a function included in mobility management functions, and when a service is transferred to a HAT, a call processing process is performed differently according to an access state of the HAT. The access network selection function should be able to select an access network according to a type of a service to be transferred to a user, a service profile of a subscriber, a QoS requirement, and a radio environment. In the redirection function, when a best access network selected by a serving network is different from an access network accessed by a HAT, the HAT is requested to direct to the selected access network.

Regarding the access network selection function, if a HAT receives a direction request to the access network selected by the serving network, the HAT finally selects an access network according to a wireless environment, its location, and a request of a user or a service.

With reference to the accompanying drawing, detailed operations of the functions illustrated in Table 3 will be separately described for a process of receiving a circuit voice call and a process of receiving IP packet.

Process of Receiving Circuit Voice Call

A process of transferring an incoming call from a PSTN to a Mobile Base Station (MBS) and a $BSC_C$ via a Gateway Mobile services Switching Center (GMSC) is based on IS-41 and ISUP, and a call reception process from the MSC through the HAT is based on an A1 interface and an IS-2000 standard. A request message and a response message for detecting an access state of the HAT must be set up between an HLR and an HSMG. Existing messages defined in IS-41 or newly defined messages are used as the request and response messages. A description of a detailed format of the messages will not be provided herein.

Figure 5:
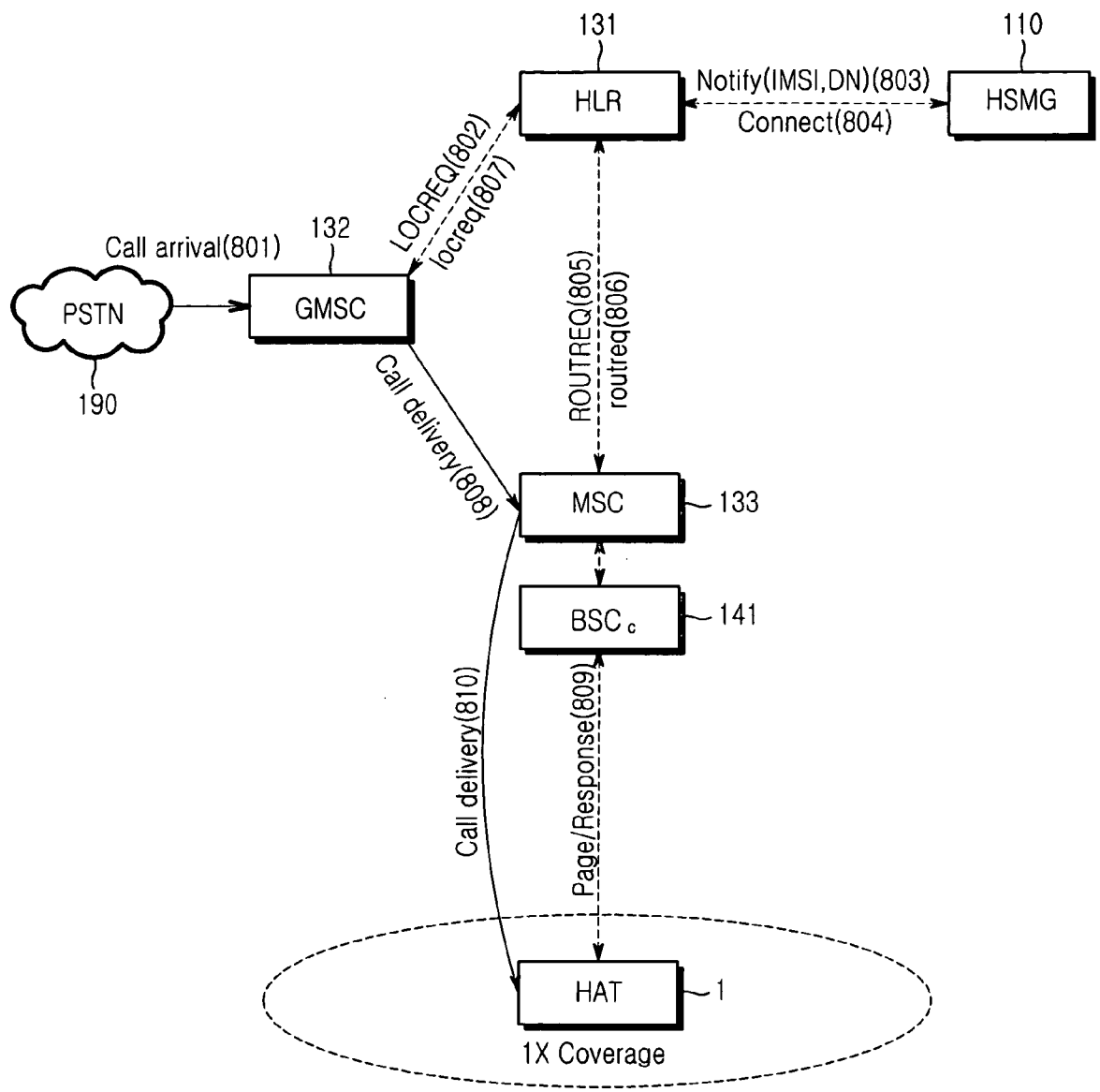
FIG. 5 is a diagram illustrating an operation of sending a circuit voice call to a HAT monitoring only a 1X paging channel in a 1X Idle state according to an embodiment of the present invention.

FIG. 5 is a diagram illustrating an operation of sending a circuit voice call to an HAT monitoring only a 1X paging channel in a 1X Idle state according to an embodiment of the present invention. Referring to FIG. 5, if a call arrives from a PSTN 190 in step 801, a GMSC 132 sends a Location Request message to an HLR 131 in step 802. In step 803, the HLR 131 determines that an access terminal receiving the call is the HAT 1 located in a heterogeneous network by searching a service profile, and sends a Notify message including MIN and caller ID information to an HSMG 110 in order to indicate reception of a circuit voice call.

In step 804, because an access state of the HAT 1 is an 'on-circuit' state, the HSMG 110 determines that a redirection process is not necessary, and sends a Connect message to the HLR 131 to request a process of processing the incoming call. Because a procedure of steps 805 to 810 performed in the HLR 131, GMSC 132, MSC 133 and HAT 1 is identical to a general procedure for processing an incoming call, a detailed description thereof will be omitted herein for simplicity.

Figure 6:
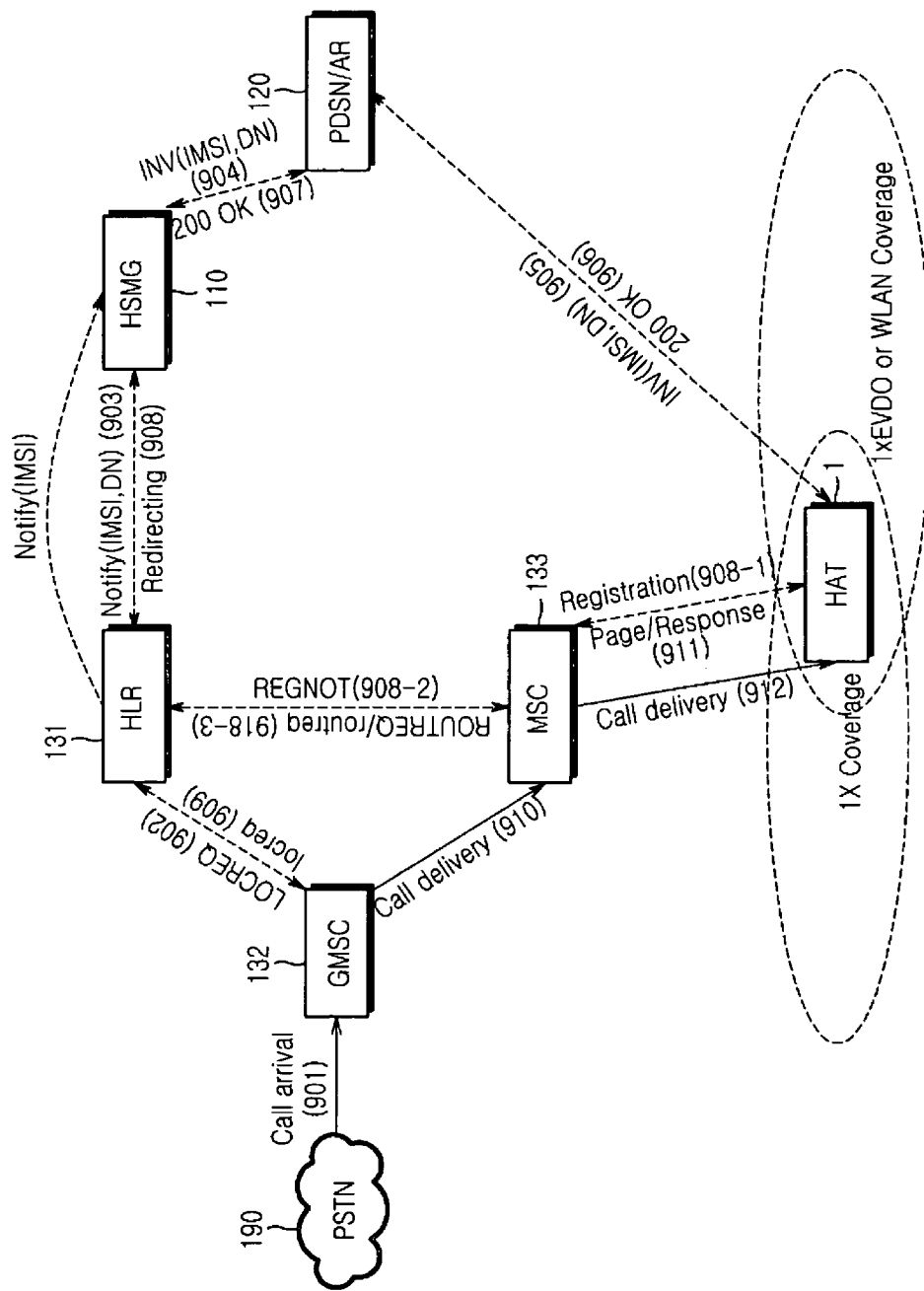
FIG. 6 is a diagram illustrating an operation of sending a circuit voice call to a HAT monitoring only a 1x EV-DO paging channel or a Wireless LAN/MAN network according to an embodiment of the present invention.

FIG. 6 is a diagram illustrating an operation of sending a circuit voice call to an HAT monitoring only a 1x EV-DO paging channel or a Wireless LAN/MAN network according to an embodiment of the present invention. Referring to FIG. 6, if a call arrives from a PSTN 190 in step 901, a GMSC 132 sends an IS-41 Location Request message to an HLR 131 in step 902. In step 903, the HLR 131 determines that an access terminal receiving the call is the HAT 1 located in a heterogeneous network by searching a service profile, and sends a Notify message including MIN and caller ID information to an HSMG 110 in order to indicate reception of a circuit voice call. In steps 904 and 905, because an access state of the HAT 1 is an 'on-packet' state, the HSMG 110 determines that a redirection process is necessary, and detects location information of the HAT 1 from a location database. Thereafter, the HSMG 110 sends an Invite message including MIN and caller ID information to the HAT 1 via a PDSN/AR 120.

If the HAT 1 in a 1X Idle state receives a SIP Invite message from the HSMG 110, the HAT 1 determines whether to direct to a CDMA 1X network considering user setup information and a wireless environment. If the HAT 1 determines, in steps 906 and 907, to direct to a CDMA 1X network and sends a 200-OK Response message to the PSMG 110 via the PDSN/AR 120, the HSMG 110 sends, in step 908, a Redirection message to the HLR 131 to indicate that the HAT 1 is directing to the CDMA 1X network, and the HLR 131 waits until the HAT 1 directs to a 1X circuit mode and registers a new location.

If the HAT 1 accesses, in step 908-1, the CDMA 1X network and registers a new location, the HLR 131 receives, in step 908-2, an IS-41 Registration Notification message from an MSC 133 and sends an IS-41 Routing Request message to the MSC 133, thereby performing a procedure for processing an incoming call. The succeeding procedure is identical to a general procedure for processing an incoming call, performed between the MSC 133 and the HAT 1.

If an incoming circuit voice call is sent to the HAT 1 in data service in an active state, the HAT 1 determines not to direct to the CDMA 1X network according to a user's decision, and sends a 600-Busy Response message to the HSMG 110. Then the HSMG 110 sends a Busy message to the HLR 131. The HLR 131 sets an 'Access Denied Reason' parameter in an IS-41 Location Response message to 'Busy', and sends the IS-41 Location Response message to GMSC 132, thereby performing a Busy process.

Process of Sending IP Packet

Although only the case where a user subscribed to a Simple IP service will be taken into consideration herein, even the case where the user subscribed to a Mobile IP service is almost identical to the case where the user subscribed for the Simple IP service except several IP mobility-related differences including the fact that an HAT uses a Mobile IP Request message instead of an SIP Registration message.

When the HAT accessed an IP network via a 1x EV-DO network or a Wireless LAN/MAN network, IP packet is sent up to the HAT through an existing well-known procedure. The embodiment of the present invention will be described only for the case where IP packet is received only when an HAT which was receiving a data service after accessing an IP network via a 1x EV-DO network or a Wireless LNA/MAN network has transitioned to an 1X Idle state after a lapse of a predetermined time. In addition, a Redirection Request message for requesting an HAT that accessed a 1X access network to redirect to a 1x EV-DO network or a Wireless LAN network, and a response message must be defined between an HSMG and an HLR. Existing messages defined in IS-41 or newly defined messages are used as such messages. A description of a detailed format of the messages will not be provided herein.

Figure 7:
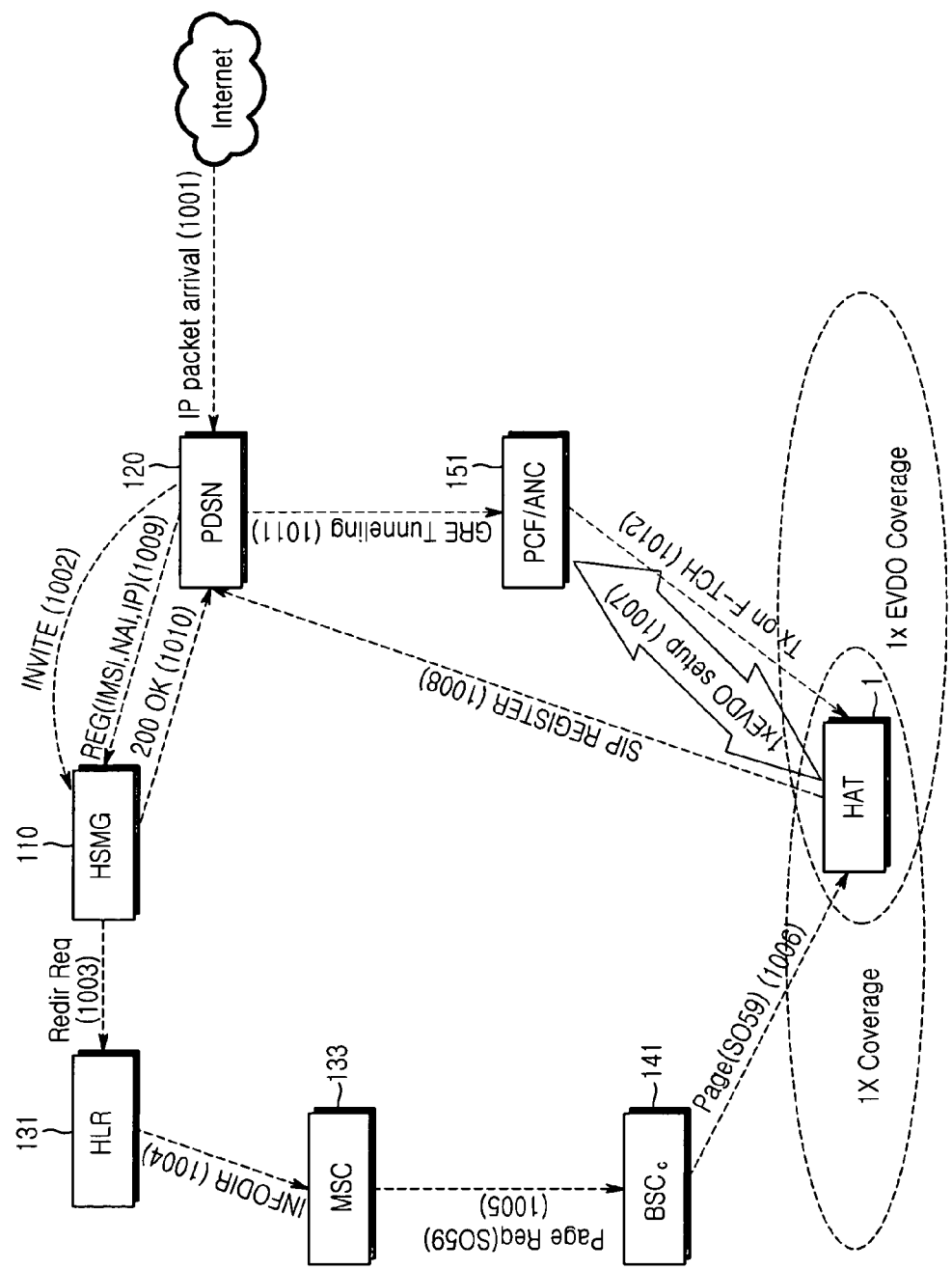
FIG. 7 is a diagram illustrating an operation in which Internet Protocol (IP) packet is sent to a HAT when the HAT holding a 1x EV-DO dormant session monitors only a CDMA 1X paging channel according to an embodiment of the present invention.

FIG. 7 is a diagram illustrating an operation in which IP packet is sent to an HAT when the HAT holding a 1x EV-DO dormant session monitors only a CDMA 1X paging channel according to an embodiment of the present invention. Referring to FIG. 7, when a PDSN 120 receives IP packet in step 1001, as an access state of the HAT 1 is an 'on-circuit' state, the PDSN 120 stores, in step 1002, the IP packet in its buffer and sends an Invite message to an HSMG 110. In step 1003, because an access state of the HAT 1 is an 'on-circuit' state, the HSMG 110 sends a Redirection to an HLR 131 in order to allow the HAT 1 to redirect to a packet network.

In step 1004, the HLR 131 sends an IS-41 Information Directive message to an MSC 133. In steps 1005 and 1006, the MSC 133 sets a service option value of a Page Request message to 59, and sends the Page Request message to a $BSC_C$ 141, so that a redirection request to a packet network is sent up to the HAT 1. If the HAT 1 determines to redirect to a 1x EV-DO access network, the HAT 1 transitions, in steps 1008 to 1011, to a 1x EV-DO Active state and sends a SIP Registration message up to the HSMG 110 via the PDSN 120. Then the IP packet stored in the buffer of the PDSN 120 is sent to the HAT 1. As the PDSN 120 sends the SIP Registration message to the HSMG 110, the HSMG 110 manages a state of the HAT 1 as an 'on-packet' state.

As described above, the embodiment of the present invention enables interworking between a circuit network and a packet network by adding an HSMG in a heterogeneous network environment, and seamlessly provides voice and packet data services to a user even though an HAT operating according to a hybrid operation monitors only one network for a predetermined time.

While the invention has been shown and described with reference to a certain embodiment thereof, it should be understood by those skilled in the art that various changes in form and details may be made therein without departing from the spirit and scope of the invention as defined by the appended claims. For example, although the embodiment of the present invention has been described with reference to services having a higher call setup speed than a Push-to-Talk (PTT) service, the present invention can be applied all types of services requiring rapid call setup.

What is claimed is:

1. A method for providing voice and data services to an access terminal for simultaneously supporting a circuit network and a packet network in a mobile communication system that supports an interworking service between the circuit network and the packet network, the method comprising:

receiving, by the access terminal, a paging message for one of a voice call and a packet data call while the access terminal monitors a particular network;

selecting, by a heterogeneous service and mobility gateway (HSMG), an optimal access network based on at least one of a service requirement relating to one of the voice and the packet data, and an access state of the access terminal;

notifying the access terminal of the selected access network by the HSMG for an interworking service between the circuit network and the packet network; and redirecting, by the access terminal, to the selected access network.

2. The method of claim 1, wherein the service requirement is selected according to a service type, a service profile for an access terminal, required quality-of-service (QoS), and a wireless environment.

3. A system for providing one of a voice and packet data through an access terminal for simultaneously supporting a circuit network and a packet network by interworking the circuit network with the packet network in a mobile communication system with a plurality of access networks overlapping each other, the system comprising:

the access terminal for receiving a paging message for one of a voice call and a packet data call while the access terminal monitors a particular network; and a heterogeneous service & mobility gateway (HSMG) for selecting an optimal access network based on at least one of a service requirement relating to one of the voice and the packet data, and an access state of the access terminal, and notifying the access terminal of the selected access network by the HSMG for an interworking service between the circuit network and the packet network, wherein the access terminal redirects to the selected access network.

4. The system of claim 3, wherein the service requirement is selected according to a service type, a service profile for an access terminal, required quality-of-service (QoS), and a wireless environment.

* * * * *